(12) United States Patent
Kim et al.

(10) Patent No.: US 11,790,186 B2
(45) Date of Patent: Oct. 17, 2023

(54) MACHINE TRANSLATION APPARATUS AND METHOD

(71) Applicant: XL8 Inc, San Jose, CA (US)

(72) Inventors: Kang Kim, Seoul (KR); Jin Hyung Park, Seoul (KR); Young Hoon Jung, San Jose, CA (US)

(73) Assignee: XL8 Inc, San Jose, CA (US)

( * ) Notice: Subject to any disclaimer, the term of this patent is extended or adjusted under 35 U.S.C. 154(b) by 182 days.

(21) Appl. No.: 17/211,014

(22) Filed: Mar. 24, 2021

(65) Prior Publication Data

US 2022/0207245 A1 Jun. 30, 2022

(30) Foreign Application Priority Data

Dec. 29, 2020 (KR) .................. 10-2020-0185665

(51) Int. Cl.
*G06F 40/58* (2020.01)
*G06F 3/0482* (2013.01)
*G06F 40/279* (2020.01)
*G06F 40/51* (2020.01)

(52) U.S. Cl.
CPC .......... *G06F 40/58* (2020.01); *G06F 3/0482* (2013.01); *G06F 40/279* (2020.01); *G06F 40/51* (2020.01)

(58) Field of Classification Search
CPC ...... G06F 40/58; G06F 3/0482; G06F 40/279; G06F 40/47; G06F 40/51
See application file for complete search history.

(56) References Cited

U.S. PATENT DOCUMENTS

| | | | | |
|---|---|---|---|---|
| 5,646,840 A | * | 7/1997 | Yamauchi | G06F 40/30 704/4 |
| 9,245,278 B2 | * | 1/2016 | Orsini | G06Q 50/01 |
| 10,846,487 B2 | * | 11/2020 | Lee | G06F 40/47 |
| 11,093,110 B1 | * | 8/2021 | Bossio | G10L 15/26 |
| 2002/0138250 A1 | * | 9/2002 | Okura | G06F 40/47 704/2 |

(Continued)

FOREIGN PATENT DOCUMENTS

| | | | |
|---|---|---|---|
| CN | 110263349 A | * | 9/2019 |
| KR | 10-0911621 B1 | | 8/2009 |

*Primary Examiner* — Richemond Dorvil
*Assistant Examiner* — Nadira Sultana
(74) *Attorney, Agent, or Firm* — Bridgeway IP Law Group, PLLC; Jihun Kim

(57) ABSTRACT

Proposed are a machine translation apparatus and a machine translation method for displaying a translation result through a user interface. The machine translation method may include: display an initial machine translation result for a first translation target sentence; correcting the initial machine translation result according to a manipulation result of a user on the user interface unit, and displaying the corrected machine translation result; and analyzing a difference between the corrected machine translation result and the initial machine translation result, and reflecting the analysis result to perform machine translation on a second translation target sentence. The machine translation apparatus and the method can be used to efficiently acquire a high-quality translation within a short time while minimizing time, cost and effort of a user, which used to be required for a conventional machine translation process.

10 Claims, 2 Drawing Sheets

(56) References Cited

U.S. PATENT DOCUMENTS

| | | | | |
|---|---|---|---|---|
| 2005/0288920 A1* | 12/2005 | Green | ................... | G06F 40/58 704/3 |
| 2016/0162478 A1* | 6/2016 | Blassin | .......... | G06Q 10/063112 706/12 |
| 2018/0143975 A1* | 5/2018 | Casal | ..................... | G06F 40/51 |
| 2019/0087417 A1* | 3/2019 | Wang | ..................... | G06F 40/53 |
| 2019/0197119 A1* | 6/2019 | Zhang | ..................... | G06F 40/58 |

\* cited by examiner

MACHINE TRANSLATION APPARATUS AND METHOD

BACKGROUND

1. Technical Field

The present disclosure relates to translation, and more particularly, to an apparatus and a method for efficient machine translation.

2. Related Art

According to the most classic translation method, a translator produces a draft translation, and a reviewer reviews and corrects the draft translation. The translation process based on such a translation method has a problem in that it requires a lot of time, cost and man power.

In order to solve such a problem, 'machine translation technology' has emerged. Examples of a translating machine in which such a machine translation technology is employed include Google translator provided by Google and Papago translator provided by NAVER.

A method for improving the quality of such machine translation or automatic translation has been disclosed in Korean Patent No. 10-0911621, entitled "Method and Apparatus for Providing Hybrid Automatic Translation". The method and apparatus evaluate an automatic translation result through a pattern-based method and an automatic translation result through a statistics-based method, select the more excellent result between the automatic translation results, and present it as the final automatic translation result.

However, even when the latest machine translation technology (or automatic translation technology) is applied, it is difficult to provide a high-quality translation through machine translation. Therefore, in order to acquire a high-quality translation with the assistance of machine translation, a reviewer still needs to review and correct a result of the machine translation. In other words, in order to acquire a high-quality translation with the assistance of machine translation, a lot of time, cost and man power still need to be required for the translation.

RELATED ART DOCUMENT (Patent Document 1) Korean Patent No. 10-0911621

SUMMARY

Various embodiments are directed to a machine translation apparatus and a machine translation method capable of efficiently acquiring a high-quality translation within a short time while minimizing time, cost and effort of a user, which used to be required for a conventional machine translation process.

In an embodiment, a machine translation apparatus may include: a user interface unit configured to display an initial machine translation result for a first translation target sentence, generate a correction instruction signal corresponding to a manipulation result of a user, and receive and display a corrected machine translation result; and a machine translation unit configured to generate the initial machine translation result, receive the correction instruction signal from the user interface unit, generate the corrected machine translation result by correcting the initial machine translation result according to the correction instruction signal, provide the corrected machine translation result to the user interface unit, analyze a difference between the corrected machine translation result and the initial machine translation result, and perform machine translation for a second translation target sentence by reflecting the analysis result.

The second translation target sentence may include at least one of the other sentences in a document including the first translation target sentence, except the first translation target sentence. In other words, the second translation target sentence may include at least one of the other sentences in the document, from which the first translation target sentence was excerpted.

The machine translation unit may be further configured to find unique features of the corrected machine translation result, which are distinguished from those of the initial machine translation result, by comparing the corrected machine translation result and the initial machine translation result, and machine-translate the second translation target sentence by reflecting the found unique features.

The user interface unit may be further configured to display, as the initial machine translation result, one candidate which is automatically selected according to preset standards, among a plurality of machine translation results which are candidates of the initial machine translation result, generate a selection signal corresponding to the user's manipulation, and display the corrected machine translation result corresponding to the selection signal, and the machine translation unit may be further configured to generate the plurality of machine translation results, provide the generated plurality of machine translation results to the user interface unit, select one among the plurality of machine translation results, as the corrected machine translation result, according to the selection signal, and provide the selected machine translation result to the user interface unit.

The machine translation unit may be configured to operate by reflecting translation direction information which is information on at least one of a title of a document including the first translation target sentence, a field and genre to which contents of the document belong, a style desired by the user, and sexes or ages of speakers appearing in the document and relationships among the speakers.

In an embodiment, there is a machine translation method for displaying a translation result through a user interface unit. The machine translation method may include: an initial display step of display an initial machine translation result for a first translation target sentence; a correction display step of correcting the initial machine translation result according to a manipulation result of a user on the user interface unit, and displaying the corrected machine translation result; and a reflection step of analyzing a difference between the corrected machine translation result and the initial machine translation result, and performing machine translation for a second translation target sentence by reflecting the analysis result.

The second translation target sentence may include at least one of the other sentences in a document including the first translation target sentence, except the first translation target sentence. In other words, the second translation target sentence may include at least one of the other sentences in the document, from which the first translation target sentence was excerpted.

The reflection step may include finding unique features of the corrected machine translation result, which are distinguished from those of the initial machine translation result, by comparing the corrected machine translation result and the initial machine translation result, and machine-translating the second translation target sentence by reflecting the found unique features.

The correction display step may include: displaying a plurality of machine translation results as candidates of the initial machine translation result; recognizing, as the corrected machine translation result, a machine translation result which is selected among the plurality of machine translation results according to the user's manipulation result on the user interface unit; and displaying the recognized machine translation result as the corrected machine translation result.

The initial display step may be performed by reflecting translation direction information which is information on at least one of a title of a document including the first translation target sentence, a field and genre to which contents of the document belong, a style desired by a user, and sexes or ages of speakers appearing in the document and relationships among the speakers.

In an embodiment, there is provided a computer readable recording medium having a computer program recorded therein, the computer program configured to display a translation result through a user interface unit and execute a machine translation method including: an initial display step of display an initial machine translation result for a first translation target sentence; a correction display step of correcting the initial machine translation result according to a manipulation result of a user on the user interface unit, and displaying the corrected machine translation result; and a reflection step of analyzing a difference between the corrected machine translation result and the initial machine translation result, and reflecting the analysis result to perform machine translation on a second translation target sentence.

The machine translation apparatus and the machine translation method in accordance with at least one of the embodiments of the present disclosure can efficiently acquire a high-quality translation within a short time while minimizing the time, cost and effort of a user.

DETAILED DESCRIPTION

Figure 1:
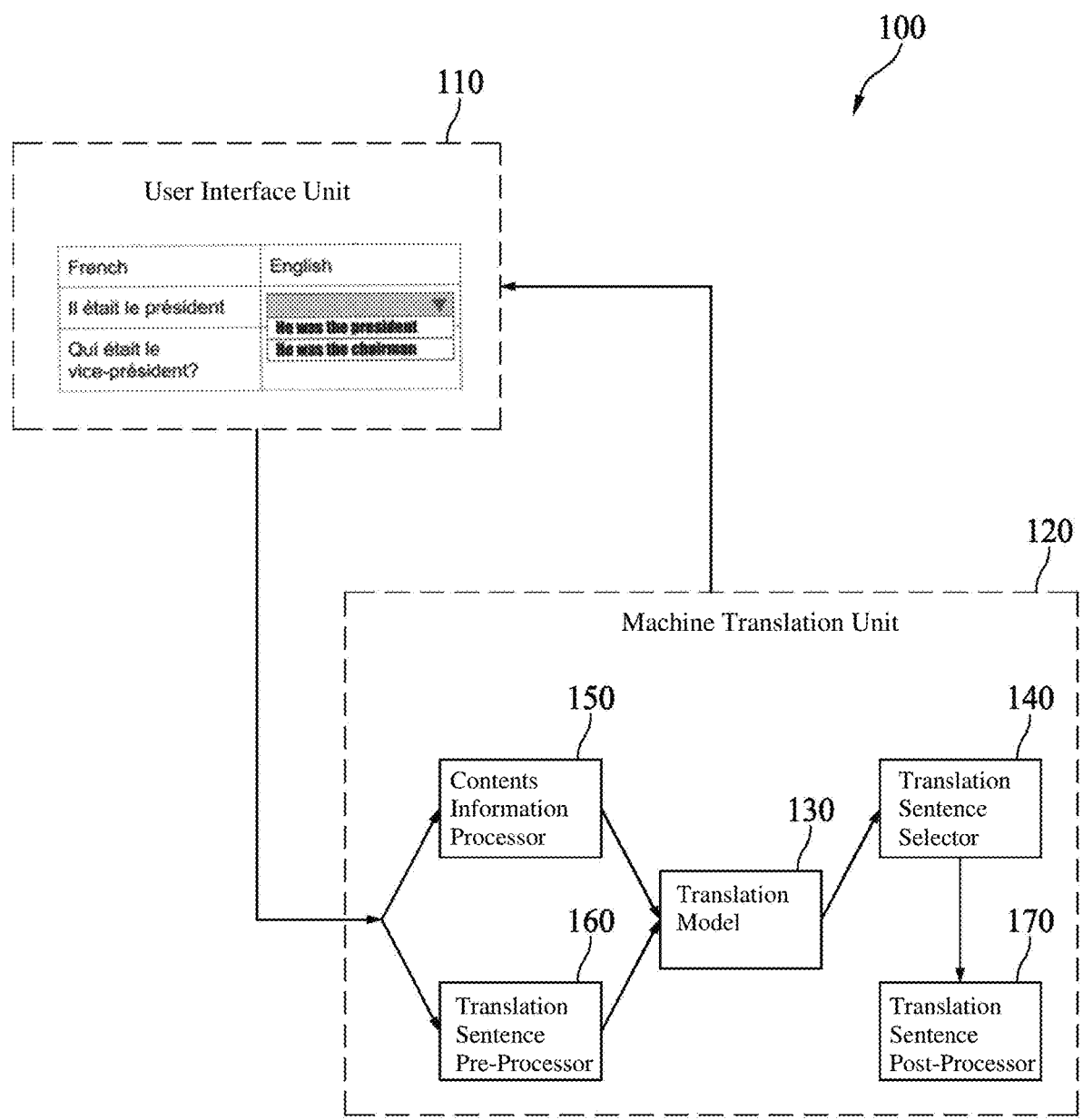
FIG. 1 is a block diagram illustrating a machine translation apparatus in accordance with at least one embodiment of the present disclosure.

Referring to FIG. 1, a machine translation apparatus 100 in accordance with at least one embodiment of the present disclosure will be described as follows.

A translation target is given in the form of 'a document' to the machine translation apparatus 100, and may include one or more sentences.

In this specification, 'the document' may indicate a document written as a material object such as paper, and a document written as an immaterial object such as an electronic file created by a word processor. In the case of a document written as a material object, the machine translation apparatus 100 in accordance with the embodiment of the present disclosure may recognize the document through a scanning method or the like. However, the method for recognizing a document written as a material object is not limited thereto.

Furthermore, a document may include not only a grammatically-complete sentence, but also 'a grammatically-incomplete sentence' or 'a word remaining in a form which is difficult to grammatically call a sentence'. In this specification or specifically in the following claims, however, a 'sentence' includes all types of words or sentences.

Furthermore, since a document may include not only texts such as sentences but also images such as pictures, the 'document' in this specification does not need to be necessarily constituted by only sentences.

The machine translation apparatus 100 in accordance with one embodiment of the present disclosure may sequentially machine-translate sentences in a document from the beginning to the end, or machine-translate only sentences at specific positions selected by a user.

The machine translation apparatus 100 may include a user interface unit 110 and a machine translation unit 120. The machine translation unit 120 may include a translation model 130, a translation sentence selector 140, a contents information processor 150, a translation sentence pre-processor 160, and a translation sentence post-processor 170.

The user interface unit 110 may be implemented by combining a component such as the screen of a PC (Personal Computer), which has only a function of simply displaying contents, and a component such as a keyboard or mouse, which has only an input function, or implemented as one component such as a touch screen, which has both a display function and an input function. The user interface unit 110 may include various implementations or embodiments as long as they can embody the claims of the present disclosure.

Now, a process in which the user interface unit 110 and the machine translation unit 120 perform machine translation in accordance with at least one embodiment of the present disclosure will be described in a time sequence, in order to advance understandings of the present disclosure. The specific roles and operations of the machine translation unit 120 and individual components included therein, such as the translation model 130 and the translation sentence selector 140, will be described below.

When the machine translation apparatus 100 in accordance with at least one embodiment of the present disclosure machine-translates sentences in a document, the user interface unit 110 first shows a user the initial machine translation result for some sentences. These some sentences may include one sentence or a plurality of sentences. In this specification, these some sentences are collectively referred to as a 'first translation target sentence'. The initial machine translation result may be created by the machine translation unit 120 and provided to the user interface unit 110, and the user interface unit 110 may display 'the initial machine translation result' for the first translation target sentence received from the machine translation unit 120. In this specification, 'the initial machine translation result' for the first translation target sentence indicates a translation result which is obtained by machine-translating the first translation target sentence for the first time or a translation result which is obtained by translating the first translation target sentence only through the machine translation and displayed on the user interface unit 110 for the first time.

Such a process of displaying 'the initial machine translation result' will be additionally described as follows. Since even the same contents can be expressed in various manners, the translation model 130 of the machine translation unit 120 may generate a plurality of machine translation results as 'candidates' of the initial machine translation result by machine-translating the first translation target sentence through various expression methods. At this time, the translation model 130 may estimate the possibility that each of the candidates will meet a user's intention, thereby automatically calculate the corresponding score (translation success rate).

In this case, the user interface unit 110 may display one candidate, which is automatically selected among the plurality of machine translation results according to a preset standard, as 'the initial machine translation result' for the first translation target sentence. For example, the user interface unit 110 may display the candidate having the highest score (translation success rate), among the plurality of machine translation results for the first translation target sentence, as 'the initial machine translation result' for the first translation target sentence.

From now, the role of the machine translation apparatus in accordance with at least one embodiment of the present disclosure, to increase the quality of machine translation, when 'the initial machine translation result' for the first translation target sentence, displayed on the user interface unit 110, is not satisfactory, will be described as follows.

A user may correct the initial machine translation result for the first translation target sentence by manipulating the user interface unit 110 on which the initial machine translation result for the first translation target sentence is displayed. In this case, the user interface unit 110 generates a correction instruction signal corresponding to the manipulation result.

The translation model 130 of the machine translation unit 120 corrects the initial machine translation result according to the correction instruction signal received from the user interface unit 110 by the machine translation unit 120, and provides the corrected machine translation result to the user interface unit 110, and the user interface unit 110 displays 'the corrected machine translation result' for the first translation target sentence.

The process of changing 'the initial machine translation result' into 'the corrected machine translation result' and displaying 'the corrected machine translation result' will be additionally described as follows.

For example, the machine translation apparatus 100 may show the user other machine translation results capable of substituting 'the initial machine translation result', and then allow the user to select a more satisfactory option among the other machine translation results. The other machine translation results may indicate one or more candidates obtained by excluding 'the initial machine translation result' displayed on the user interface unit 110 from the plurality of machine translation results which are generated as 'the candidates' of 'the initial machine translation result' for the first translation target sentence by the translation model 130 of the machine translation unit 120. For example, FIG. 1 may be based on the supposition that 'the initial machine translation result' for the first translation target sentence which is a French sentence 'Il était le président' in a box 110 of FIG. 1 is 'He was the president' (from French to English). In this case, when the user wants to see other machine translation results capable of substituting 'the initial machine translation result', the user interface unit 110 may receive another machine translation result 'He was the chairman', which can substitute 'the initial machine translation result', from the machine translation unit 120, and show the user the received machine translation result. If the user is satisfied with the another machine translation result and thus selects the another machine translation result, the initial machine translation result is changed to the another machine translation result, and the another machine translation result immediately becomes 'the corrected machine translation result' of the first translation target sentence.

In this way, when the user manipulates the user interface unit 110 to select any one machine translation result among other (one or more) machine translation results showed by the user interface unit 110 as options or choices capable of substituting 'the initial machine translation result' for the first translation target sentence, the user interface unit 110 generates a selection signal corresponding to the manipulation result. In this case, the translation sentence selector 140 of the machine translation unit 120 decides one of the plurality of machine translation results as 'the corrected machine translation result' according to the selection signal, and provides the decided machine translation result to the user interface unit 110, and the user interface unit 110 displays the decided machine translation result as the corrected machine translation result for the first translation target sentence.

In another example, the user may manipulate the user interface unit 110 to correct 'the initial machine translation result' by reflecting the user's characteristics, without seeing the options or choices of the other machine translation results capable of substituting 'the initial machine translation result' for the first translation target sentence, displayed on the user interface unit 110, and the machine translation unit 120 may generate 'the corrected machine translation result' for the first translation target sentence according to the manipulation of the user.

After 'the corrected machine translation result' for the first translation target sentence is generated, the machine translation apparatus in accordance with at least one embodiment of the present disclosure may perform machine translation as follows.

The machine translation unit 120, or specifically the translation model 130 included therein, may perform machine translation on a second translation target sentence. At this time, the machine translation unit 120 may perform machine translation by reflecting 'the corrected machine translation result' for the first translation target sentence. Specifically, the translation model 130 may determine and analyze how the initial machine translation result for the first translation target sentence was corrected by the user. In other words, the translation model 130 may analyze a difference between 'the initial machine translation result' and 'the corrected machine translation result', and perform machine translation on the second translation target sentence by reflecting the analysis result. More specifically, the translation model 130 of the machine translation unit 120 may find the unique features of the corrected machine translation result, which are differentiated from those of the initial machine translation result, by comparing 'the corrected machine translation result' and 'the initial machine translation result', and perform machine translation on the second translation target sentence by reflecting the found unique features.

In this specification, the second translation target sentence indicates at least some of the other sentences except the first translation target sentence in the document including the first translation target sentence. For example, the machine translation apparatus 100 machine-translates all sentences in a given document one by one from the beginning to the end. As described above, when a certain sentence (for example, 'the first translation target sentence') was corrected by the user, the translation model 130 may analyze a difference between the initial machine translation result for the first translation target sentence and the corrected machine translation result, and reflect the analysis result when machine-translating the very next sentence (for example, 'the second translation target sentence') to the first translation target sentence, thereby allowing the user not to perform the same pattern of correction. In this example, the second translation target sentence is the very next sentence to the first translation target sentence. However, this is only an example for the convenience of description. In another example, the second translation target sentence may indicate all sentences following the first translation target sentence, all sentences before the first translation target sentence, or all sentences except the first translation target sentence regardless of the positions of the sentences.

The machine translation apparatus 100 in accordance with at least one embodiment of the present disclosure can efficiently acquire a high-quality translation in a short time, while minimizing the time, cost, and effort of a user.

The machine translation apparatus 100 in accordance with at least one embodiment of the present disclosure may receive 'information on the direction or preference of a translation, desired by a user (hereafter, referred to as 'translation direction information')' before performing machine translation, and then perform machine translation according to the translation direction information. More specifically, the contents information processor 150 of the machine translation unit 120 may receive the translation direction information from the user through the user interface unit 110. In this case, the translation model 130 may perform machine translation according to the translation direction information.

Examples of the translation direction information may include information on the title of a document to be translated, i.e. the document including the first translation target sentence, the field to which the contents of the document belong (for example, publication field, broadcasting field, medical field or legal profession), the genre to which the contents of the document belong (for example, sports, romance, comedy or entertainment), the style of a translation result desired by a user (for example, whether honorifics are used), and the sexes or ages of speakers and the relationships among the speakers when several speakers appear in the document.

Finally, the translation sentence pre-processor 160 and the translation sentence post-processor 170, which may be included in the machine translation unit 120 of the machine translation apparatus 100 in accordance with at least one embodiment of the present disclosure, will be described. In general, a conventional machine translation apparatus performs machine 'translation' only. Thus, when an expression (hereafter, referred to as a 'special symbol etc.') such as a special symbol or foreign word, which is difficult to machine-translate, is included in the first translation target sentence, the translation sentence pre-processor 160 may remove the special symbol etc. from the first translation target sentence or replace the special symbol etc. with another symbol which can be machine-translated, before the machine translation is performed in earnest, such that the machine translation can be effectively performed. Then, the translation sentence pre-processor 160 provides the processing result to the translation model 130. The translation sentence post-processor 170 processes the initial machine translation result (for the first translation target sentence) or the corrected machine translation result, which is generated by the translation model 130 and the translation sentence selector 140, in a reverse manner to the processing method performed by the translation sentence pre-processor 160, and provides the processing result to the user interface unit 110.

Figure 2:
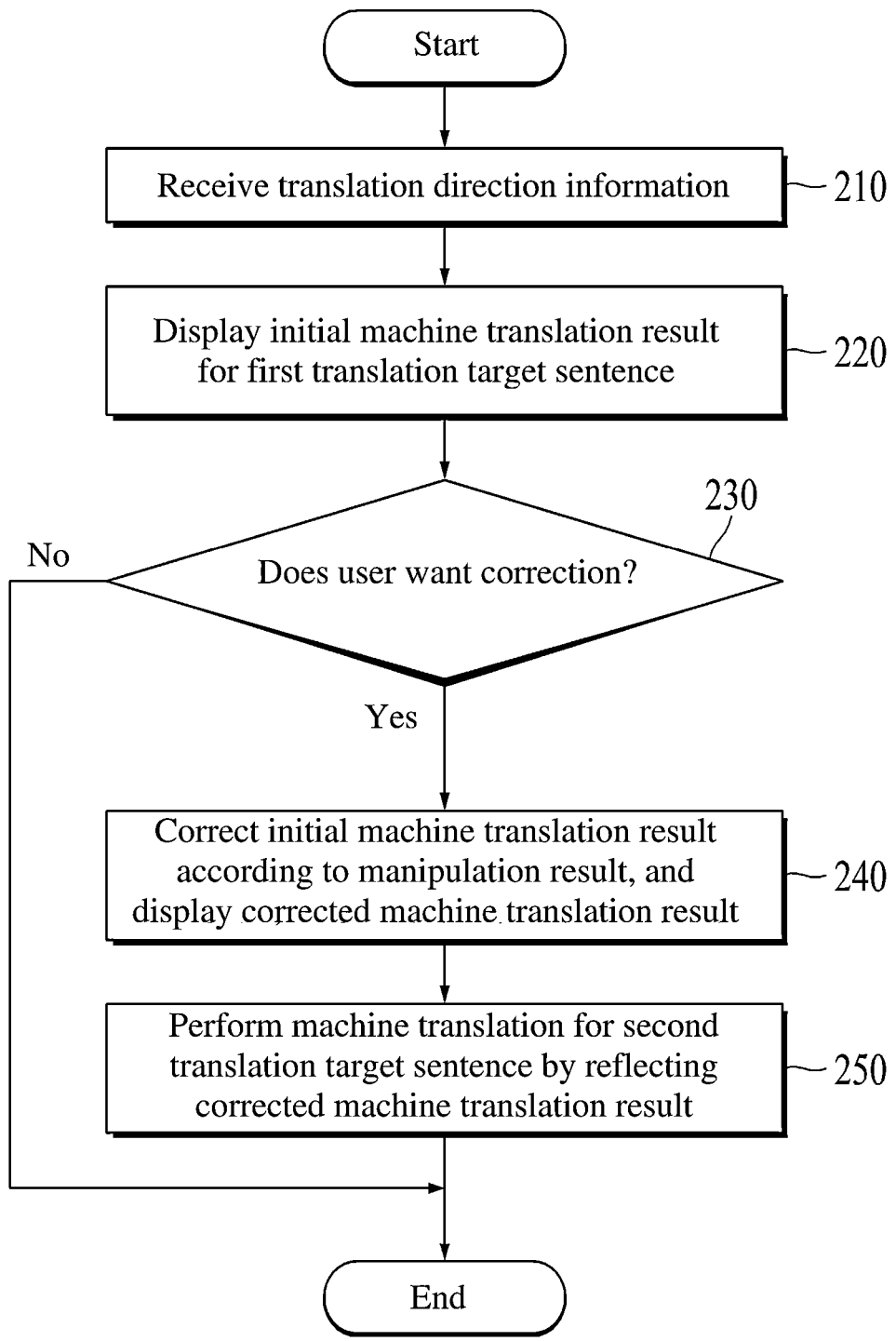
FIG. 2 is a flowchart illustrating a machine translation method in accordance with at least one embodiment of the present disclosure.

FIG. 2 is a flowchart for describing a machine translation method in accordance with at least an embodiment of the present disclosure. Hereafter, the machine translation method will be described with reference to FIG. 1.

First, the user interface unit 110 receives translation direction information from a user in step S210, and displays 'the initial machine translation result' for a first translation target sentence in step S220.

After step S220, the machine translation apparatus 100 determines whether the user wants to correct the initial machine translation result for the first translation target sentence, in step S230. For example, when the user wants to correct the initial machine translation result and shows a correction intention by manipulating the user interface unit 110, the machine translation apparatus 100 determines that the user wants to correct the initial machine translation result, in step S230.

When it is determined in step S230 that the user wants to correct 'the initial machine translation result' for the first translation target sentence, the user interface unit 110 provides the user with an operation environment that allows the user to correct the initial machine translation result, and the user manipulates the user interface unit 110 in order to instruct the machine translation unit 120 to correct 'the initial machine translation result' for the first translation target sentence according to a correction instruction of the user. When the machine translation unit 120 generates 'the corrected machine translation result' according to such a principle, the user interface unit 110 displays 'the corrected machine translation result' for the first translation target sentence, in step S240.

After step S240, the machine translation unit 120 analyzes a difference between 'the corrected machine translation result' displayed in step S240 and 'the initial machine translation result' displayed in step S210, and reflects the analysis result to perform machine translation on a second translation target sentence, in step S250. In this way, the machine translation unit 120 may increase the possibility that the user will be satisfied with the initial machine translation result for the second translation target sentence, and increase the possibility that a high-quality translation result will be acquired, without performing the correction operation in steps S230 and S240.

When it is determined in step S230 that the user does not want to correct 'the initial machine translation result' for the first translation target sentence, the machine translation unit 120 may not perform steps S230 to S250, but machine-translate the second translation target sentence.

A computer readable recording medium in accordance with at least an embodiment of the present disclosure may store a computer program for performing the above-described machine translation method (see FIG. 2).

The above descriptions on the present disclosure are only for some embodiments, and the person skilled in the art to which the present disclosure pertains can variously modify and carry out these embodiments without departing from the claims. Therefore, the claims should not be construed as being limited by the above descriptions on these embodiments.

What is claimed is:
1. A machine translation apparatus comprising:
a machine translation processor configured to perform machine translation for a first translation target sentence and generate an initial machine translation result which is to be displayed on a screen of a user interface unit, receive a correction instruction signal from the user interface unit, generate a corrected machine trans- lation result by correcting the initial machine translation result according to the correction instruction signal, provide the corrected machine translation result to the user interface unit, analyze a difference between the corrected machine translation result and the initial machine translation result to generate an analysis result, and perform machine translation for a second translation target sentence by reflecting the analysis result, wherein the machine translation processor is further configured to receive translation direction information from the user through the user interface unit before machine translation and perform the machine translation by reflecting the translation direction information which is information on at least one of a title of a document including the first translation target sentence, a field and genre to which contents of the document belong, a style desired by the user, and sexes or ages of speakers appearing in the document and relationships among the speakers, and wherein the machine translation processor is further configured to remove a special symbol that cannot be machine-translated from the first translation target sentence or replace the special symbol with another symbol that can be machine-translated before the machine translation, and process the initial machine translation result or the corrected machine translation result in a reverse manner to the removing or replacing of the special symbol, and the user interface unit including the screen and configured to display the initial machine translation result for the first translation target sentence on the screen, generate the correction instruction signal corresponding to the manipulation input from a user via the user interface unit, and display the corrected machine translation result on the screen.

2. The machine translation apparatus of claim 1, wherein the second translation target sentence comprises at least one of the other sentences in a document including the first translation target sentence, except the first translation target sentence.

3. The machine translation apparatus of claim 1, wherein the machine translation processor is further configured to find unique features of the corrected machine translation result, which are distinguished from those of the initial machine translation result, by comparing the corrected machine translation result and the initial machine translation result, and machine-translate the second translation target sentence by reflecting the found unique features.

4. The machine translation apparatus of claim 1, wherein the user interface unit is further configured to display, as the initial machine translation result, one candidate which is automatically selected according to preset standards, among a plurality of machine translation results which are candidates of the initial machine translation result, generate a selection signal corresponding to the user's manipulation, and display the corrected machine translation result corresponding to the selection signal.

5. The machine translation apparatus of claim 4, wherein the machine translation unit is further configured to generate the plurality of machine translation results, provide the generated plurality of machine translation results to the user interface unit, select one among the plurality of machine translation results, as the corrected machine translation result, according to the selection signal, and provide the selected machine translation result to the user interface unit.

6. A machine translation method for displaying a translation result produced by a machine translation processor through a user interface unit, the machine translation method comprising:

receiving a first translation target sentence from the user interface unit, translating the first translation target sentence by the machine translation processor to produce an initial machine translation result, displaying the initial machine translation result for the first translation target sentence on the user interface unit;

correcting the initial machine translation result according to a manipulation input from a user on the user interface unit, and displaying the corrected machine translation result on the user interface unit; and analyzing, by the machine translation processor, a difference between the corrected machine translation result and the initial machine translation result to produce an analysis result, and performing, by the machine translation processor, machine translation for a second translation target sentence by reflecting the analysis result, wherein the second translation target sentence is received by the user from the user interface unit, wherein the machine translation method further comprises:

receiving translation direction information from the user through the user interface unit before machine translation; and performing the machine translation by reflecting the translation direction information which is information on at least one of a title of a document including the first translation target sentence, a field and genre to which contents of the document belong, a style desired by the user, and sexes or ages of speakers appearing in the document and relationships among the speakers, wherein the machine translation method further comprises:

removing a special symbol that cannot be machine-translated from the first translation target sentence or replace the special symbol with another symbol that can be machine-translated before the machine translation; and processing the initial machine translation result or the corrected machine translation result in a reverse manner to the removing or replacing of the special symbol.

7. The machine translation method of claim 6, wherein the second translation target sentence comprises at least one of the other sentences in a document including the first translation target sentence, except the first translation target sentence.

8. The machine translation method of claim 6, wherein the analyzing the difference and performing the machine translation comprises:

finding unique features of the corrected machine translation result, which are distinguished from those of the initial machine translation result, by comparing the corrected machine translation result and the initial machine translation result; and machine-translating the second translation target sentence by reflecting the found unique features.

9. The machine translation method of claim 6, wherein the correcting the initial machine translation result and displaying the corrected machine translation result comprises:

displaying a plurality of machine translation results as candidates of the initial machine translation result;

recognizing, as the corrected machine translation result, a machine translation result which is selected among the plurality of machine translation results according to the user's manipulation result on the user interface unit; and displaying the recognized machine translation result as the corrected machine translation result.

10. A non-transitory computer readable recording medium having a computer program recorded therein, the computer program being configured to execute the method of claim 6.

* * * * *